(12) United States Patent
Paulsen et al.

(10) Patent No.: US 7,709,149 B2
(45) Date of Patent: May 4, 2010

(54) COMPOSITE PRECURSOR FOR ALUMINUM-CONTAINING LITHIUM TRANSITION METAL OXIDE AND PROCESS FOR PREPARATION OF THE SAME

(75) Inventors: Jens M. Paulsen, Daejeon (KR); Yonghoon Kwon, Daejeon (KR); Jaeup Jang, Daejeon (KR); Hong-Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 1296 days.

(21) Appl. No.: 10/950,105

(22) Filed: Sep. 24, 2004

(65) Prior Publication Data

US 2006/0068289 A1    Mar. 30, 2006

(51) Int. Cl.
*H01M 4/58* (2006.01)
*H01B 1/02* (2006.01)

(52) U.S. Cl. .............................. 429/231.95; 429/218.1; 252/521.2

(58) Field of Classification Search .................. 429/128, 429/218.1
See application file for complete search history.

(56) References Cited

U.S. PATENT DOCUMENTS 6,902,845 B2 * 6/2005 Tani et al. ................ 429/218.2
6,998,071 B2 * 2/2006 Maeda et al. ............ 252/521.2

OTHER PUBLICATIONS

Isupov, P. V., Intercalation Compounds of Aluminum Hydroxide, Journal of Structural Chemistry, vol. 40, No. 5, pp. 672-685 (1999).*

\* cited by examiner

*Primary Examiner*—Dah-Wei D Yuan
*Assistant Examiner*—Zachary Best
(74) *Attorney, Agent, or Firm*—Cantor Colburn LLP

(57) ABSTRACT

The present invention provides a powdery composite precursor, which comprises a core of a lithium transition metal oxide, and an aluminum hydroxide-based precipitate layer coated on the surface of the core, and a process to prepare the composite precursor. The preparation process comprises the formation of a water based slurry by dispersing lithium transition metal oxide powder in water, and a precipitation reaction of an aluminum salt solution with a base solution where the lithium transition metal particles act as seed particles, whereby a mechanically stable precipitate layer of homogeneous thickness can be achieved. The composite precursor can be converted into aluminum-containing, e.g., aluminum-doped, lithium transition metal oxide suitable for a cathode active material of lithium rechargeable battery by heat treatment.

5 Claims, 4 Drawing Sheets

COMPOSITE PRECURSOR FOR ALUMINUM-CONTAINING LITHIUM TRANSITION METAL OXIDE AND PROCESS FOR PREPARATION OF THE SAME

FIELD OF THE INVENTION

The present invention relates to a composite precursor for aluminum-containing lithium transition metal oxide and a process for preparation thereof. More specifically, the present invention relates to a composite precursor comprising a core of lithium transition metal oxide and an aluminum hydroxide-based precipitate layer coated on the surface of the core, and a preparation process of the composite precursor by precipitation reaction of an aluminum salt solution and a base solution to coat the lithium transition metal oxide, as a seed particle, in a water-based slurry or paste.

BACKGROUND OF THE INVENTION

In commercial rechargeable lithium batteries, lithiated transition metal oxides are employed as a cathode active material and these transition metal oxides include, for example, materials of the layered crystal structure such as $LiCoO_2$, $Li(Mn_{1/2}Ni_{1/2})_{1-x}Co_xO_2$, or $LiNi_{1-x}Co_xO_2$, and materials of the spinel crystal structure such as lithium manganese oxide spinel or lithium manganese-nickel oxide spinel. Depending on the application, certain properties of these materials are of importance and such properties can be modified by processing, doping, surface treatment, control of impurities, etc.

Some of these materials, particularly where only one type of transition metal is present, can be easily prepared by solid state reaction using simple transition metal precursors. However, more "complex" materials, particularly where two or more types of transition metals are present, are difficult or impossible to prepare by simple solid state reaction, i.e. by mixing separate transition metal precursors. Instead, complex lithium transition metal oxides are generally prepared by reacting mixed precursors, e.g., mixed hydroxides or mechanically alloyed transition metal oxides, with a source of lithium.

Mixed hydroxides are typically prepared by precipitation reaction. Precipitation of mixed hydroxides (for example, the precipitation of a flow of NaOH with a flow of $M-SO_4$ under controlled pH) or mixed carbonates (for example, the precipitation of a flow of $Na_2CO_3$ with a flow of $M-SO_4$) allows precursors of suitable morphology to be achieved. A problem is the level of impurities; especially, the removal of sulfur is difficult and expensive. The same problems apply to the removal of sodium in the case of mixed carbonates.

Meanwhile, as one method for modification of lithium transition metal oxides, doping has been widely investigated. The doping typically does not exceed 5% by atoms of dopant per transition metal. Typical dopants are either inserted isostructurally into the existing crystal structure (e.g., Al-doped $LiCoO_2$) or they form a secondary phase, often agglomerating at grain boundaries (e.g., Zr-doped $LiCoO_2$).

In the doping approach, aluminum is a general dopant. The benefit of aluminum-modified lithium transition metal oxides has been widely investigated. For example, it is known that adding Al to the crystal structure of $LiNi_{1-x}Co_xO_2$ improves safety and cycling stability. For example, Al-doped $LiMn_{2-x}Li_xO_4$ spinel cycles more stably and also shows less dissolution of Mn, and Al-coated $LiCoO_2$ cycles more stably at high voltage.

A problem associated with aluminum-modified lithium transition metal oxides, i.e., Al-containing lithium transition metal oxides, is the preparation process thereof. In the case of complex lithium transition metal oxides, mixed precursors would have to contain aluminum; however, it is more difficult to prepare Al-containing precursors such as Al-doped mixed transition metal hydroxide. Alternatively, lithium transition metal oxides could be prepared by mixing raw materials with a source of aluminum such as $Al_2O_3$ or $Al(OH)_3$. In this regard, it should be noted that $Al_2O_3$ has low reactivity and $Al(OH)_3$ is easily transformed to $Al_2O_3$ at low temperature. Therefore, the obtained cathode is nonhomogeneously doped so that the benefit of aluminum doping is not fully utilized.

In a process for preparation of Al-doped materials, if a layer containing a reactive aluminum phase were to fully cover the surface of a subject particle such as lithium transition metal oxide, this would be advantageous. If this were possible, the diffusion pathway would be short and the contact area would be large so that an Al-doped material could be achieved at relatively low reaction temperature. As will be illustrated later, the present invention discloses such composite precursor fully coated with a reactive aluminum phase and a process for preparation of the composite precursor.

Meanwhile, besides the Al doping approach, an Al coating approach is also known as a means to improve properties. In a conventional Al coating process, lithium transition metal oxide particles are dipped into an aluminum-containing solution or gel, followed by drying and mild heat treatment. As a result, the surface of lithium transition metal oxide is coated by an aluminum oxide-based phase. This phase separates the electrolyte from the more reactive bulk and promises improved properties. However, the conventional Al coating process has demerits as explained below.

In the prior art Al coating process, lithium transitional metal oxides are dipped into $AlPO_4$ or tri-butyl aluminum dissolved in ethanol. Problems are the cost of raw materials and the use of organic solvents that may cause the generation of gas during reaction or drying procedures. A further problem is that only a small amount of Al can be coated on the lithium transition metal oxide. Low solubility of $AlPO_4$ or tri-butyl aluminum limits the amount of aluminum present in a layer formed by dip-coating. Where an organic solvent is used in large amounts to compensate for the low solubility, aluminum-containing particles form, but fail to cover the lithium transition metal oxide. Generally, the contact between the aluminum compound and lithium transition metal oxide after a drying procedure is maintained mainly by physical adhesion and to a lesser extent by chemical bonds. Accordingly, although a thicker coating layer is made, it tends to disintegrate during drying.

As an alternative approach, a particle coating process is also known in the art. In this process, coating is achieved by dipping lithium transition metal oxides into a slurry of fine particles. Alternatively, it is also possible to apply a dry coating approach. In this dry coating process, fine powders, typically $Al_2O_3$ particles of sub-micrometer size are mixed with lithium transition metal oxides. However, the particle coating process has some disadvantages, as follows: (i) it is difficult to achieve a full coverage by fine particles; (ii) it is difficult to prevent agglomeration of fine powders, and the resulting agglomerates fail to efficiently cover the surface of lithium transition metal oxide; and (iii) the adhesion between fine particles and lithium transition metal oxide is poor so that the coating layers tend to peel off during subsequent processes.

Therefore, improved precursors for cathode active material and a method to prepare such precursors are needed. The improved precursors could be characterized as lithium transition metal oxide with a uniformly thick layer fully covering the particle, the layer having good mechanical contact, containing aluminum and being practically free of impurities.

SUMMARY OF THE INVENTION

The objects of the present invention are to completely solve the problems described above.

Specifically, an object of the present invention is to provide a composite precursor for aluminum-containing lithium transition metal oxide as a cathode active material. The composite precursor has an aluminum hydroxide-based precipitate layer of active aluminum phase on the surface of a lithium transition metal oxide core and can be converted into an Al-doped lithium transition metal oxide by heat treatment.

Another object of the present invention is to provide a process of preparing the composite precursor by precipitation reaction of an aluminum salt solution and base solution. This precipitation process has many advantages; for example, impurities such as sulfur, sodium or chloride present in raw materials can be tolerated, and organic solvents are not used, and a fully coated, stable product can be obtained.

A further object of the present invention is to provide an aluminum-containing lithium transition metal oxide able to be produced from the composite precursor. The aluminum-containing lithium transition metal oxide can be applied to a cathode active material for rechargeable lithium batteries.

In order to accomplish these objects, there is provided in the present invention a composite precursor for aluminum-containing lithium transition metal oxide comprising (a) a lithium transition metal oxide core, and (b) an aluminum hydroxide-based precipitate layer of active aluminum phase coated on the surface of the lithium transition metal oxide core, with the aluminum hydroxide-based precipitate containing a divalent anion. This composite precursor is a novel material not known in the art to which the present invention pertains.

In an embodiment of the present invention, the aluminum hydroxide-based precipitate layer is lithium-aluminum-sulfate-hydroxide-hydrate. In this case, the divalent anion is sulfate. The sulfate present in the precipitate layer can be easily replaced by carbonate to allow the precipitate layer to be practically free of sulfur. Therefore, the aluminum hydroxide-based precipitate layer is preferably of lithium-aluminum-carbonate-hydroxide-hydrate. In this case, the divalent anion is carbonate.

The present invention also provides a process for the preparation of the composite precursor, comprising a step of carrying out the precipitation reaction of an aluminum salt solution and base solution with a lithium transition metal oxide as a seed particle dispersed in a water-based slurry or paste to form an aluminum hydroxide-based precipitate layer on the surface of lithium transition metal oxide particle.

In a preferable embodiment of the present invention, after the precipitation reaction, an ion exchange reaction is further performed to replace the sulfate present in the precipitate layer with carbonate by adding a carbonate solution into the reaction system. Several experiments described in the present disclosure surprisingly show that the ion exchange reaction allows the precipitate layer to be practically free of sulfate.

Also, the present invention provides an aluminum-containing lithium transition metal oxide produced by heat treatment of the composite precursor as defined above. This aluminum-containing lithium transition metal oxide is suitable for a cathode active material of lithium rechargeable battery, showing more excellent properties than the prior art lithium transition metal oxide and Al-coated or Al-doped lithium transition metal oxides.

DETAILED DESCRIPTION OF THE INVENTION

Figure 1:
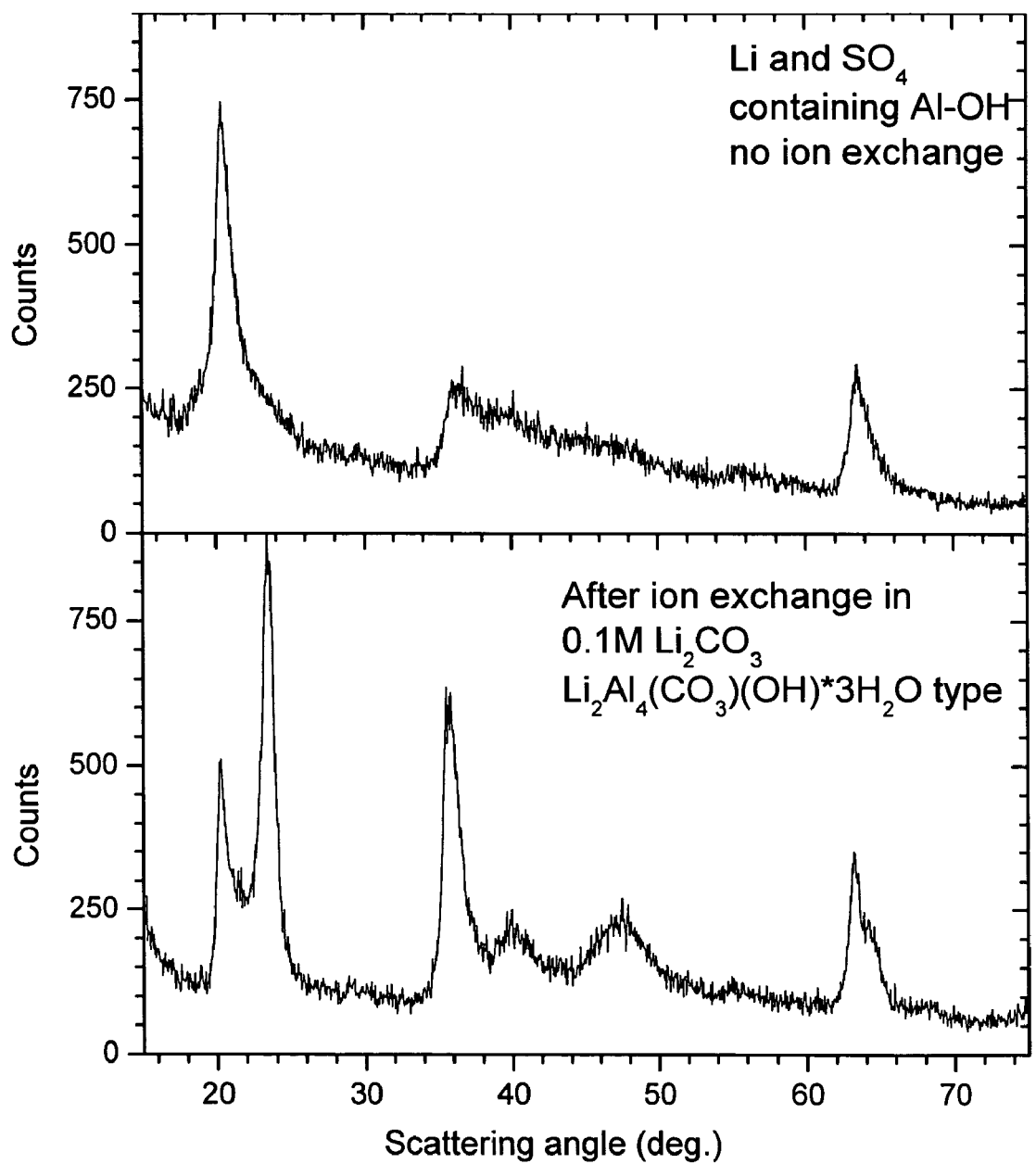
FIG. 1 is the combination of two X-ray diffraction patterns in which the top shows the precipitate after gentle drying and the bottom shows the lithium aluminum carbonate hydroxide hydrate obtained after an ion exchange reaction followed by gentle drying.

The present invention is illustrated below in more detail.

In the composite precursor according to the present invention, the thickness of the precipitate layer is not particularly limited because it can be varied depending upon the aluminum content required for an intended aluminum-containing lithium transition metal oxide. In an embodiment, the total amount of aluminum in the precipitate layer is 0.5 to 5% by atoms with respect to the total amount of transition metal in the complex precursor.

As has been mentioned already, the aluminum hydroxide-based precipitate layer is present as an active aluminum phase which is a thermodynamically stabilized phase resistant to dissolving even at high pH, and which can also be easily converted into an Al-doped layer of lithium transition metal oxide by appropriate heat treatment.

The lithium transition metal oxide as the core of composite precursor has a layered or spinel crystal structure, and includes, for example, but is not limited to $LiCoO_2$, cobalt-rich $Li(Mn_{1/2}Ni_{1/2})_{1-x}Co_xO_2$, lithium manganese spinel such as $LiMn_{2-x}Li_xO_4$ and doped lithium manganese spinel, lithium manganese-nickel spinel such as $Li(Mn_{1.6}Ni_{0.4})O_4$, lithium manganese nickel oxide such as $LiMn_{1/3}Ni_{1/3}Co_{1/3}O_2$, or lithium nickel oxide-based materials such as $LiNi_{0.8}Co_{0.2}O_2$ and $LiNi_{0.8}Co_{0.15}A_{0.05}O_2$ (A=Mn, Al, MgTi, etc.).

In the preparation process of the composite precursor according to the present invention, the lithium transition metal oxide as a raw material can be tolerated to contain impurities such as sulfur, sodium, chloride, etc. which are highly undesirable in commercial lithium rechargeable batteries. Surprisingly, these impurities are removed from the lithium transition metal oxide during the precipitation reaction of the present invention, which can be seen in Example 10 of the present disclosure. Accordingly, for preparation of the lithium transition metal oxide as a raw material, cheaper chemicals can be employed and additional procedures for removal of impurities, such as a washing step in the prior art, are not required.

Also, in the process of the present invention, no organic solvents which may cause the generation of gas during processing are used, whereas water which can be easily removed by appropriate separation such as filtering is used.

In addition, the process of the present invention allows a homogenous, thicker aluminum-containing coating to be achieved, compared to the prior art process. Furthermore, the achieved coating layer has excellent mechanical stability.

In the precipitation reaction process, a water-based slurry is first prepared containing lithium transition metal oxides particles. The solid fraction of slurry preferably exceeds 30~50% (w/w).

The aluminum salt as one of the reactants for the precipitation reaction includes, for example, but is not limited to aluminum sulfate, aluminum potassium sulfate, aluminum sodium sulfate, etc. Among them, aluminum sulfate is particularly preferred because of its high content of Al, high solubility and large scale availability. In some cases, the aluminum salt can be used in combination with other salts, for example, transition metal sulfate such as cobalt, manganese or nickel sulfate, etc.

The base salt as the other reactant for precipitation reaction includes, for example, but is not limited to lithium hydroxide, sodium hydroxide, potassium hydroxide, ammonium hydroxide, sodium carbonate and the like, or mixtures of two or more thereof. Among them, lithium hydroxide is particularly preferred because the precipitation reaction is possible even at high pH without dissolution of aluminum.

The reaction ratio of aluminum salt and base salt is preferably chosen so that the pH is in the range of 6~12. According to experiments carried out by the inventors of the present invention, it was ascertained that when the equivalent of base salt is the same as or more than the equivalent of aluminum salt, no aluminum remains in the liquid part of the slurry after the precipitation reaction.

The reaction ratio of these salts and lithium transition metal oxide particle can be determined depending upon the intended thickness of precipitate layer. In other words, where a thin layer is intended, a low reaction ratio is required. On the other hand, where a thick layer is intended, a higher reaction ratio is required.

As mentioned above, where an aluminum-doped lithium transition metal oxide is required as a cathode active material for lithium rechargeable battery, it might be preferred to prepare an aluminum-free lithium transition metal oxide particle, either in powder or slurry form, and then fully cover the particle by an aluminum-containing precipitate layer according to the present invention. The precipitate layer can be converted into an aluminum-containing, doped layer by heat treatment.

As the lithium transition metal oxide, as mentioned above, used can be $LiCoO_2$, cobalt-rich $Li(Mn_{1/2}Ni_{1/2})_{1-x}Co_xO_2$, lithium manganese spinel, lithium manganese-nickel spinel, lithium manganese nickel oxide, or lithium nickel oxide-based materials, etc. In an embodiment, instead of lithium transition metal oxides, raw materials thereof such as mixed hydroxides, or slurries containing the mixed hydroxides may be used. These mixed hydroxides are, for example, $M(OH)_2$, carbonates such as $MCO_3$, or oxohydroxides such as $MOOH$, wherein M basically consists of Mn, Ni, Co, etc.

For example, $LiNiO_2$-based materials such as $LiNi_{0.8}Co_{0.15}Mn_{0.05}O_2$, and Ni—Mn oxide materials such as $Li(Mn_{1/2}Ni_{1/2})_{1-x}Co_xO_2$ are typically prepared from precipitated hydroxides. In these cases, these hydroxides are β-Ni(OH)$_2$ type in which Ni is divalent and they do not contain a significant amount of anions such as $SO_4^{-2}$ or crystalline water. Meanwhile, trivalent Al does not fit to the crystal structure of an intended material. If Al and Ni are co-precipitated, the resulting hydroxides contain counter anions such as sulfate and crystalline water. Accordingly, it is obvious that these hydroxides are less desirable for a large scale process.

The lithium transition metal oxide in the preparation process of the present invention is preferably a powder of monolithic particles. Monolithic is defined as particle having a small inner porosity and the typical example thereof is a potato-shaped or coarse particle. After the precipitation reaction, a complete, homogenous layer of precipitate covers the monolithic particle. If particles are porous, less precipitate covers the interior of the particle. Alternatively, the lithium transition metal can be a powder consisting of secondary particles, being dense agglomerates of smaller primary crystallites; however, it is recommended that the inner porosity is not too large.

The precipitation reaction is conducted in a precipitation vessel as a reactor containing the lithium transition metal oxide slurry. For example, at least one flow containing an aluminum salt solution and at least one flow containing a base solution are fed to the reactor. Preferably, both flows are injected continuously and the pH is adjusted to the range of 6~12. In a preferable embodiment, the aluminum salt is aluminum sulfate and the base is lithium hydroxide. It should be noted that where LiOH is used as a base, precipitation is possible even at high pH. It is assumed that the existence of a thermodynamically stabilized phase—lithium aluminum sulfate hydroxide hydrate—reduces the tendency of aluminum to dissolve at high pH.

During the precipitation reaction, a layer of aluminum hydroxide-based material precipitates onto the surface of lithium transition metal oxide particle. As a result, an aluminum hydroxide-based layer of homogeneous thickness, completely covering the surface of lithium transition metal oxide particle, is achieved. The aluminum hydroxide-based layer is not of simple $Al(OH)_3$ but lithium-aluminum-sulfate-hydroxide-hydrate.

As mentioned above, an ion exchange reaction may be further performed using a carbonate solution after the precipitation reaction. For example, a clear $Li_2SO_4$ solution, as a solution produced after the precipitation reaction, is removed and then replaced by a carbonate solution.

The carbonate for ion exchange reaction includes, for example, but is not limited to lithium carbonate, sodium carbonate, ammonium carbonate, potassium carbonate or the mixture of two or more thereof. Among them, the lithium carbonate is most preferable. The lithium carbonate can be used in an aqueous form of low concentration, for example 0.1M $Li_2CO_3$. When the lithium carbonate is used, a homogeneous layer of lithium-aluminum-carbonate-hydroxide-hydrate is obtained. However, it was confirmed that using hydroxides or other salts instead of the carbonate were much less effective to provide the sulfate-free precipitate layer in the present invention, which can be seen in Example 5 of the present disclosure.

After the precipitation reaction or the further ion exchange reaction, the coated particle, more specifically, particle coated with aluminum hydroxide-based layer, is separated and/or washed, followed by drying.

In an embodiment, before or after drying, any chemical can be further added. The chemical includes, for example, but is not limited to $LiPO_3$, which is added preferably in an aqueous form. In this case, the porosity of aluminum hydroxide-based layer can act like a sponge, thus supporting a homogeneous distribution of the added liquid within the particle.

In anther embodiment, after drying, the resulting powder may be further mixed with any other chemicals. The chemical includes, for example, but is not limited to $Li_2CO_3$, $Li_3AlF_6$, etc., which is mixed preferably in a solid powder form.

An aluminum-containing lithium transition metal oxide according to the present invention can be made by performing a heat treatment of the composite precursor as prepared above at a temperature sufficient to sinter the lithium transition metal oxide. The temperature of heat treatment is typically in the range of 500~1050° C. At such sufficiently high temperature, the Al enrichment of the surface vanishes due to fast bulk diffusion and Al-doped lithium transition metal oxide is achieved. However, if the heat treatment temperature is too low, the surface remains Al rich and the bulk is less doped or undoped. A desirable heat treatment temperature to achieve a dense surface without excessive bulk diffusion of aluminum is 700~950° C.

DETAILED DESCRIPTION OF THE PREFERRED EMBODIMENTS

Hereinafter, the present invention will be described in more detail by Examples, but the scope of the present invention is not limited thereto.

Example 1

In the present example, the precipitate of aluminum salt and base salt was investigated. A flow of 1.33M $Al_2(SO_4)_3$ solution and a flow of 4M LiOH solution were continuously fed at a constant rate to a reactor containing 200 ml of $H_2O$ during agitation. The temperature was 60° C. and pH was 9.0 when measured at 40° C. The total amount of aluminum was 0.05 mol. The precipitate was washed by decanting, filtered and dried at 60° C. in dynamic vacuum. The chemical analysis on the decanted and filtered solution surprisingly showed that no aluminum remained in the solution.

The precipitate was investigated by ICP for the contents of Al and Li and by X-ray to investigate the crystal structure. The content of sulfur was estimated by EDS. The result showed that the precipitate is basically of aluminum hydroxide, additionally containing lithium and sulfur. The composition of Al, Li and S is approximately $Al_{0.7}Li_{0.3}(SO_4)_{0.2}$. The X-ray diffraction pattern is disclosed in FIG. 1. The X-ray pattern shows a single-phase material. Particularly, the crystal structure is different from $Al(OH)_3$. Sulfur and lithium are part of the crystal structure and they do not exist as a second phase ($Li_2SO_4$), which explains why further washing was not effective to remove lithium and sulfur. As a result, it is confirmed that, after the precipitation reaction, a lithium-aluminum-sulfate-hydroxide-hydrate had been formed.

Then, an ion exchange reaction was performed by aging a slurry containing fresh precipitated lithium-aluminum-sulfate-hydroxide-hydrate in a 0.1M $Li_2CO_3$ solution in which the molar ratio of $CO_3:SO_4$ was adjusted to approximately 5:1. The X-ray pattern obtained after the ion exchange reaction resembles that of lithium-aluminum-carbonate-hydroxide-hydrate ($Li_2Al_4(CO_3)(OH)_{12}*3H_2O$).

Example 2

A commercial lithium manganese spinel (Mitsui) was used as seed particles. A slurry was prepared by adding 300 ml of $H_2O$ to 250 g of lithium manganese spinel. A flow of 1.33M $Al_2(SO_4)_3$ solution and a flow of 4M LiOH solution were continuously fed at a constant rate to a reactor containing the slurry. The temperature was 80° C. and pH was 9.9 when measured at 50° C. 2.5 atom % Al was precipitated per 1 Mn in spinel.

The surface structure of the spinel obtained after washing and drying was investigated in the same manner as in Example 1 to confirm that the surface of the spinel is covered by an aluminum hydroxide-based precipitate. EDS investigation showed that the precipitate contained approximately 25% by atoms of sulfur relative to precipitated Al.

Example 3

$LiCoO_2$ having the monolithic particle morphology was used as seed particles, and a slurry containing 2 kg of $LiCoO_2$ in 1 L of water was prepared. About 200 ml of the slurry was fed to a reactor. A flow of 1.33M $Al_2(SO_4)_3$ solution and a flow of 4M LiOH solution were continuously fed to the reactor at a constant rate. 2% by atoms of Al were precipitated relative to Co.

In addition, several preparations were carried out under various reaction conditions, i.e., temperatures varying from 20 to 90° C., pH varying from about 8 to 11, varying flow rates, etc., so that the precipitation reaction was finished after 4, 10 or 20 minutes. In some preparations, 1 mol of $Li_2SO_4$ per liter water was initially added to the slurry.

Figure 2A:
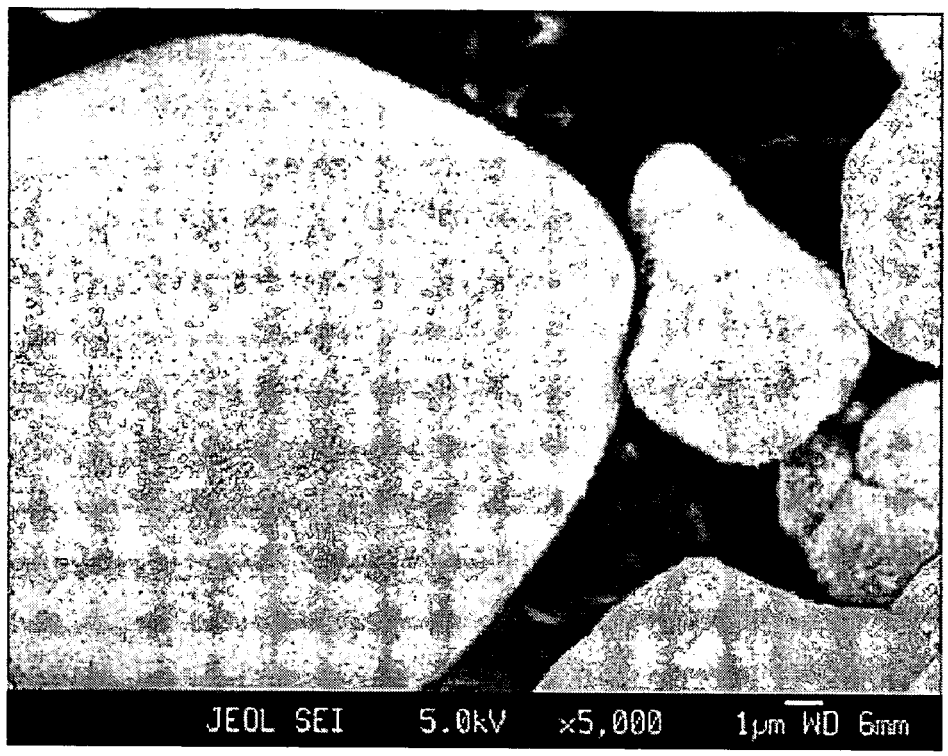
FIGS. 2A-2C are FESEM micrographs of $LiCoO_2$ particle coated with lithium-aluminum-carbonate-hydroxide-hydrate after drying at 180° C., prepared in Example 3.
Figure 2B:
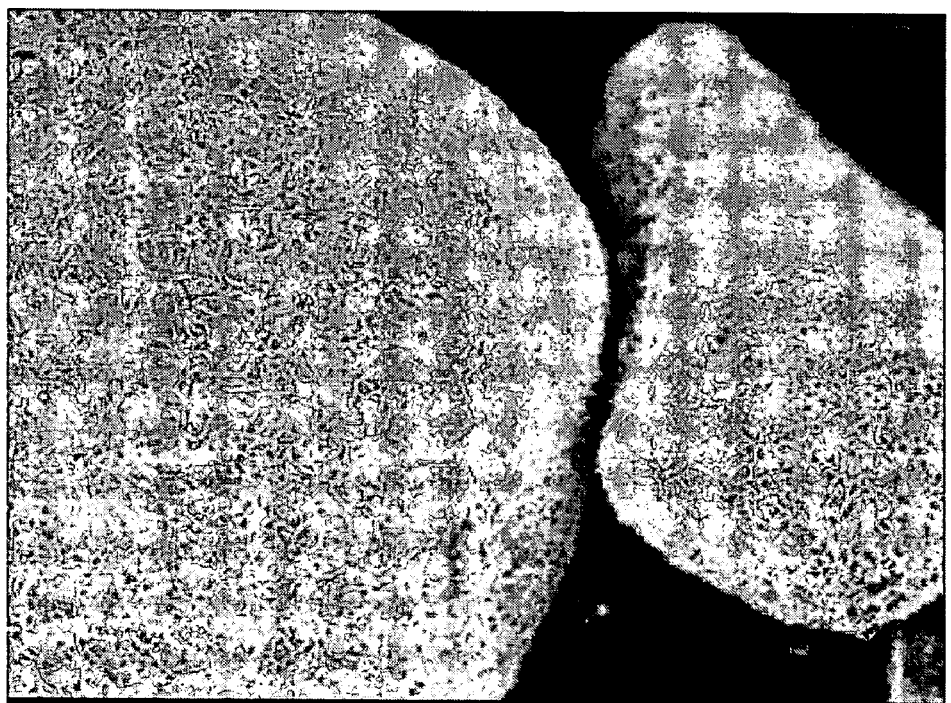
Figure 2C:
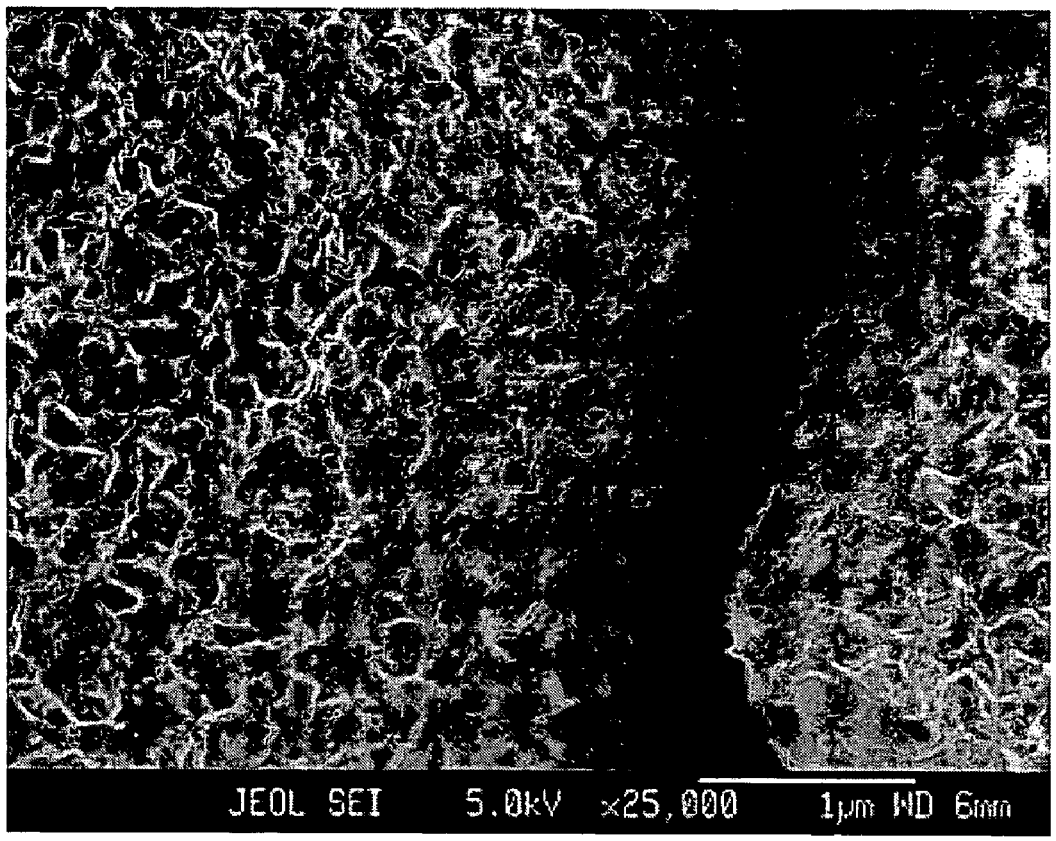

The experiments showed that in all cases, a homogeneous layer of Al-hydroxide-based precipitate, more specifically lithium-aluminum-sulfate-hydroxide-hydrate, fully covering the $LiCoO_2$ surface was formed. The FESEM micrographs showing such coated particles are disclosed in FIGS. 2A~2C. The experiments also showed that the morphology of the precipitate layer can be easily controlled, particularly, in view of a higher or lower density, and different crystallite size, etc.

Example 4

The experiment was conducted in the same manner as in Example 2 except that a mixed solution of aluminum sulfate and cobalt sulfate was used instead of an aluminum sulfate solution. The experimental result showed that the surface of the lithium manganese spinel was fully covered by a cobalt-aluminum mixed hydroxide layer with homogenious thickness, which contained additionally sulfate and lithium.

By EDS analysis, the molar composition ratio of Al:Co:S was measured to be approximately 0.8:1:0.25. The lithium content was not quantified.

Example 5

The experiment was conducted in the same manner as in Example 3 except that a slurry was prepared from 200 g of commercial $LiCoO_2$ and 150 ml of water, and the temperature was adjusted to 60° C., and pH was adjusted to 8.9 when measured at 40° C. The obtained sample had a precipitate layer formed on the surface of $LiCoO_2$. The layer contained 3% by atoms of Al per 1 Co atom.

After the precipitation reaction, the sample was washed by decanting and divided into beakers, then low concentration solutions of suitable salts, i.e., $Li_2CO_3$, $Na_2CO_3$ (approximately 0.03M), LiOH, NaOH, LiF (approximately 0.06M) and $Li_3AlF_6$ (0.01M), respectively, were added thereto. After 24 h, the resulting samples were washed and dried.

The sulfur content and the degree of aluminum dissolution were measured by EDS analysis. The analysis result surprisingly showed that $Li_2CO_3$ and $Na_2CO_3$ effectively remove sulfur without causing Al dissolution, whereas LiOH and NaOH were less effective to remove sulfur and a portion of aluminum was dissolved, and furthermore LiF and $Li_3AlF_6$ failed to ion exchange sulfur.

Example 6

A slurry was prepared from 4 kg of commercial $LiCoO_2$ and 2 L of water, and sulfuric acid was added thereto to neutralize the slurry. At 60° C., a flow of 1.33M $Al_2(SO_4)_3$ solution and a flow of 4M LiOH solution were continuously fed to the 5 L reactor containing the slurry with agitation. The precipitation reaction was continued for 25 minutes with pH being adjusted to 9.6. As a result, a precipitate layer of 2% by atoms of Al relative to Co was formed.

After the precipitation reaction, the Al-coated $LiCoO_2$ was washed by repeated decanting. The reactor was refilled with water and 37 g of $Li_2CO_3$ was added and dissolved with gentle stirring. After 10 hours, the resulting $LiCoO_2$ was washed by decanting, followed by filtering and drying.

EDS analysis showed that $LiCoO_2$ coated with lithium-aluminum-carbonate-hydroxide-hydrate and substantially free of sulfur is obtained. More specifically, approximately 2% by atoms of sulfur were present for every Al atom present in the precipitate layer.

Example 7

The experiment was conducted in the same manner as in Example 6 except that the coated $LiCoO_2$ after washing by decanting and filtering was not dried. More specifically, instead of the filtercake being placed into a baker, a small amount of water was added until a slurry of high viscosity was achieved. 4.5M $LiPO_3$ solution was dropped in while agitating the slurry, which was then dried. In summary, 2% by atoms of P was added relative to cobalt atom.

As a result, $LiCoO_2$ coated with lithium-aluminum-carbonate-hydroxide-hydrate was additionally coated with 2% glassy $LiPO_3$.

Example 8

The Al—Li—OH—$CO_3$ coated $LiCoO_2$ of Example 6 was mixed with $Li_2CO_3$ at an amount of 0.4 g $Li_2CO_3$ per 100 g $LiCoO_2$. The mixture was heated to either 750, 800, 850, 900 or 950° C.

FESEM analysis showed that the degree of sintering and diffusion of Al into the particle can be easily controlled by correct choice of sintering temperature. Specifically, at 950° C., a merely Al-doped $LiCoO_2$ with a smooth surface was achieved, whereas at the lowest temperature, a structured, electrically insulating layer of aluminum oxide covered the surface. At intermediate temperatures, a dense, poorly structured layer based on strongly Al doped $LiCoO_2$ covered the entire surface.

As additional experiments, 100 g samples of the Al—Li—OH—$CO_3$ coated $LiCoO_2$ of Example 6 were mixed with 1.2 g of a ballmilled mixture of $Li_2CO_3$ and $Li_3AlF_6$ (1:2 by weight), followed by heating to 850, 900 or 930° C. Herein, the fluorine salt acts as a sintering additive (lowering the sintering temperature required to achieve a certain degree of densification) as well as a component supplying an additional protective layer of LiF after the sintering.

Example 9

The product of Example 3 was heated to 700° C. Using the heat-treated product as a cathode active material, coin cells were fabricated in combination with Li metal anode to perform the electrochemical test at 60° C. Charge and discharge rate was C/5 (C1=150 mA/g). The cycling was performed for 32 cycles between 3.0 and 4.4V. As a control group, coin cells were also fabricated using untreated $LiCoO_2$ and tested in the same manner. The result is disclosed in the graph of FIG. 3.

Figure 3:
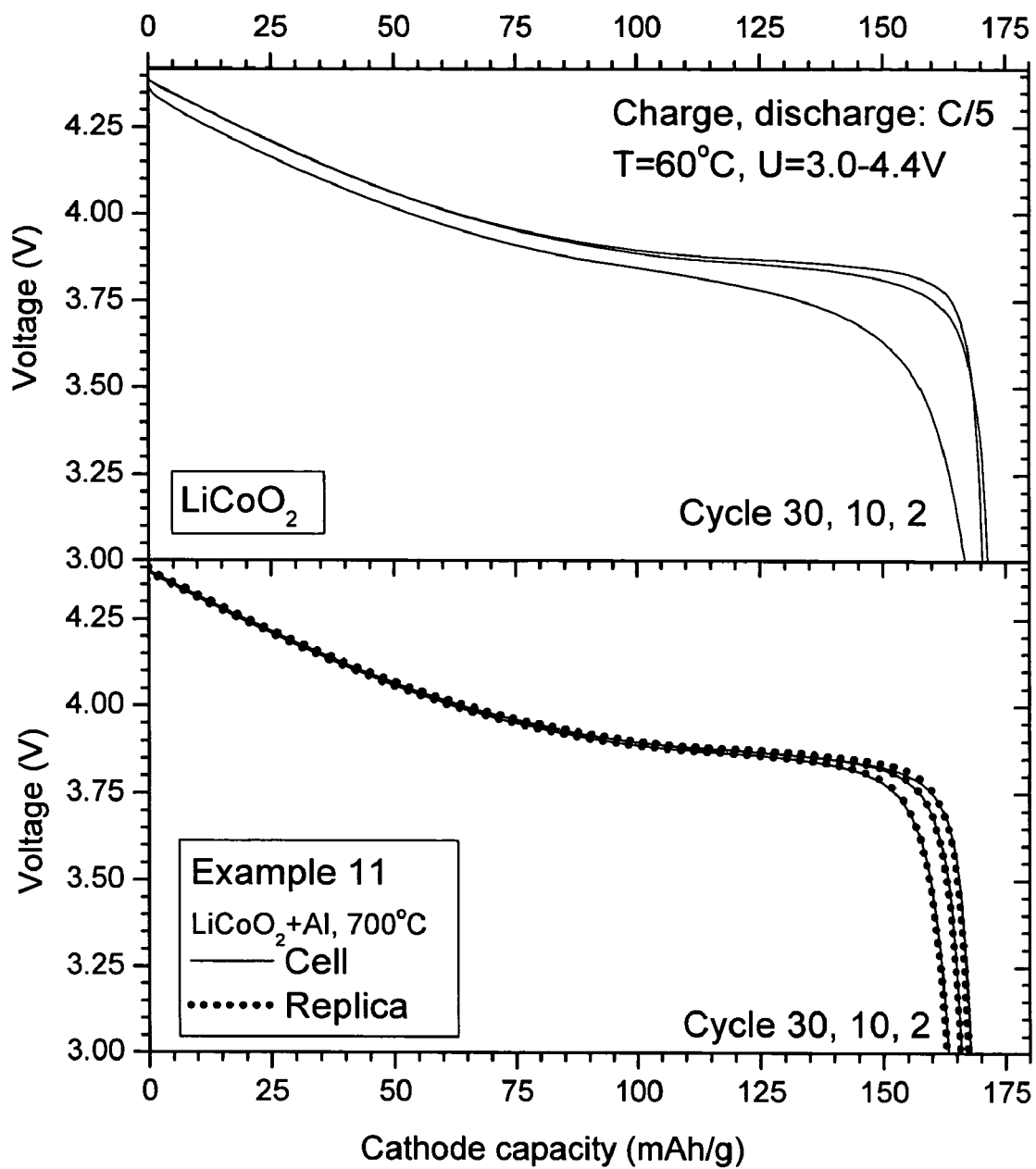
FIG. 3 is a combination of two graphs for electrochemical cycling (C/5, 60° C.), in which the top shows untreated $LiCoO_2$ and the bottom shows aluminum modified $LiCoO_2$, carried out in Example 9.

Referring to FIG. 3, the cells according to the present invention showed an exceptional cycling stability compared to untreated $LiCoO_2$. The untreated $LiCoO_2$ showed clear degradation, visible by the suppression of the voltage profile at the end of discharge, and also showed the increase of electrical resistance, probably due to the decomposition of electrolyte.

Example 10

Impurity-containing $LiCo_{0.8}Mn_{0.1}Ni_{0.1}O_2$ was prepared by mixing a carbonate precursor, lithium carbonate and lithium sulfate, followed by heat treatment at 1000° C. The carbonate precursor was a mixed carbonate, obtained by precipitation of transition metal sulfate with sodium carbonate and thus contained a significant level of sodium impurity. Chemical analysis and EDS showed that $LiCo_{0.8}Mn_{0.1}Ni_{0.1}O_2$ contained about 5% by atoms of sodium and 6% by atoms of sulfur per transition metal atom.

The impurity-containing $LiCo_{0.8}Mn_{0.1}Ni_{0.1}O_2$ as a precursor was coated with Al—Li—OH—$CO_3$-hydrate in the same manner as in Example 6. The experimental result showed that during the coating process, sulfur and sodium impurities are removed by dissolution into solution so that $LiCo_{0.8}Mn_{0.1}Ni_{0.1}O_2$ coated with Al—Li—OH—$CO_3$-hydrate and practically free of sodium and sulfur impurities was achieved.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A composite precursor for an aluminum-containing lithium transition metal oxide, the composite precursor comprising: (a) a lithium transition metal oxide core, and (b) an aluminum hydroxide-based precipitate layer comprising an active aluminum phase coated on the surface of the lithium transition metal oxide core, wherein the aluminum hydroxide-based precipitate contains a divalent anion, and wherein the divalent anion is carbonate and the aluminum hydroxide-based precipitate layer comprises a lithium-aluminum-carbonate-hydroxide-hydrate.

2. The composite precursor according to claim 1, wherein the total amount of aluminum in the precipitate layer is 0.5 to 5% by atoms in respect to the total amount of transition metal in the complex precursor.

3. The composite precursor according to claim 1, wherein the lithium transition metal oxide as the core of composite precursor has a layered or spinel crystal structure.

4. An aluminum-containing lithium transition metal oxide for a cathode active material of lithium rechargeable battery, produced by heating the composite precursor of claim 1 in the range of 500~1050° C.

5. The aluminum-containing lithium transition metal oxide according to claim 4, wherein the temperature of heat treatment is 750~950° C.

* * * * *